US008583081B2

(12) United States Patent
Ait Aissa et al.

(10) Patent No.: US 8,583,081 B2
(45) Date of Patent: Nov. 12, 2013

(54) METHOD FOR CALCULATING A FIRST IDENTIFIER OF A SECURE ELEMENT OF A MOBILE TERMINAL ACCORDING TO A SECOND IDENTIFIER OF SAID SECURE ELEMENT

(75) Inventors: Radouane Ait Aissa, Marseille (FR); Jean-François Gros, Marseille (FR)

(73) Assignee: Gemalto SA, Meudon (FR)

( * ) Notice: Subject to any disclaimer, the term of this patent is extended or adjusted under 35 U.S.C. 154(b) by 14 days.

(21) Appl. No.: 13/375,839

(22) PCT Filed: Jun. 4, 2010

(86) PCT No.: PCT/EP2010/057822
§ 371 (c)(1),
(2), (4) Date: Jan. 23, 2012

(87) PCT Pub. No.: WO2010/139780
PCT Pub. Date: Dec. 9, 2010

(65) Prior Publication Data
US 2012/0115443 A1    May 10, 2012

(30) Foreign Application Priority Data
Jun. 5, 2009  (EP) .................................... 09305516

(51) Int. Cl.
*H04M 1/66* (2006.01)
*H04M 1/68* (2006.01)
*H04M 3/16* (2006.01)

(52) U.S. Cl.
USPC ......... 455/411; 455/558; 455/410; 455/435.1

(58) Field of Classification Search
USPC .............................. 455/558, 410, 411, 435.1
See application file for complete search history.

(56) References Cited

U.S. PATENT DOCUMENTS

| 6,225,888 B1 | 5/2001 | Juopperi |
| 2006/0058028 A1 | 3/2006 | Allison et al. |
| 2006/0141987 A1 | 6/2006 | De Groot |
| 2007/0167161 A1* | 7/2007 | Cheng et al. ............... 455/435.1 |
| 2008/0064367 A1* | 3/2008 | Nath et al. .................... 455/411 |

FOREIGN PATENT DOCUMENTS

| WO | WO 03/077585 A | 9/2003 |
| WO | WO 2004/030394 A | 4/2004 |
| WO | WO 2008/092998 A | 8/2008 |

OTHER PUBLICATIONS

International Search Report (PCT/ISA/210) issued on Oct. 4, 2010, by European Patent Office as the International Searching Authority for International Application No. PCT/EP2010/057822.

* cited by examiner

*Primary Examiner* — Kwasi Karikari
(74) *Attorney, Agent, or Firm* — Buchanan Ingersoll & Rooney PC

(57) ABSTRACT

The invention relates to a method for calculating a first identifier of a secure element of a mobile terminal according to a second identifier of said secure element. The first identifier is a temporary identifier and the second identifier is a final identifier of the secure element in a telecommunications network. According to the invention, the method comprises the steps of: a—during the first attempt to connect the mobile terminal to the telecommunications network, calculating the first identifier according to the second identifier; b—transmitting the first identifier to the telecommunications network; c—in response to a message of acceptance of the first identifier from the telecommunications network, inhibiting the use of the first identifier by the secure element and, for every subsequent attempt to connect to the telecommunications network, using the second identifier to authenticate the secure element.

4 Claims, 2 Drawing Sheets

METHOD FOR CALCULATING A FIRST IDENTIFIER OF A SECURE ELEMENT OF A MOBILE TERMINAL ACCORDING TO A SECOND IDENTIFIER OF SAID SECURE ELEMENT

The field of the invention is that of telecommunications networks, more particularly that of the secure elements used in the mobile terminals communicating on such networks.

Secure element means a card such as a SIM (Subscriber Identity Module) card used in terminals of the GSM or USIM (Universal Subscriber Identity Module) types used in terminals of the UMTS type. Secure element also means a security module fixedly (not removable) built-in in a mobile terminal.

Such secure elements are more particularly used for authenticating the subscriber of the mobile terminal with the telecommunications network operator. Authentication consists in transmitting to the telecommunication networks from the mobile terminal containing the secure element, an identifier of the secure element. Such identifier is called IMSI (International Mobile Subscriber Identity) in a GSM or UMTS system. The IMSI characterizes the secure element and thus the person having taken a subscription with the telecommunications network. Recognition of the IMSI at the level of the operator's network enables the subscriber to connect thereto and the operator to manage the user's subscription.

The IMSIs of the secure elements are generated by the operator supplying these to the secure elements manufacturers. The latter, during the customization phase of the secure elements, securedly store one IMSI in each secure element. Each secure element then includes one IMSI which is its own and which will enable a subsequent authentication in the operator's network. Upon completion of the customization, the secure elements are sold to the operator who dispatches these within his/her commercial network, which sells these in turn to the future subscribers.

In order to enable a new subscriber to connect to the telecommunications network with his/her mobile terminal as soon as he/she buys a secure element, the IMSI of such secure element must be known to the network. For this purpose, the IMSIs of the secure elements are funded at the level of the operator's network when such IMSIS are supplied to the secure elements manufacturer(s), or at least when the customization of such secure elements is launched. Such IMSIs are, in practice, funded in the HLRs of the operator's network. The HLR or Home Location Register is an element of the GSM mobile telephone cellular network. This is the central data base including the information relating to any subscriber authorized to use this GSM network. This database is used as a reference for the other local data bases, the VLRs, so that data is consistent all over the network.

The HLR more particularly contains information characterizing the user him/herself:
- the IMSI, identifying the user,
- the IMEI defining the used mobile terminal,
- the MSISDN (Mobile Station Integrated Service Digital Network) giving the international call number to be used for contacting the subscriber,
- the services subscribed to by the subscriber, the status of the call forwarding service, . . . .

Funding the IMSIs at the level of the HLR raises the following problem: a very long time, i.e. several months or even several years if the operator fails to sell his/her stocks of secure elements, may elapse between the customization of a secure element and the purchase thereof by a subscriber. Now, funding the IMSIs at the level of a HLR entails non negligible costs. Now, when an operator requests the customization of several millions of secure elements and cannot sell his/her stocks quickly enough, this means a very significant financial loss since he/she must fund the IMSIs of not sold secure elements.

In order to remedy this drawback, it is known to write into the secure elements not only one IMSI, but two IMSIs: one temporary IMSI, noted $IMSI_t$, and a final IMSI, noted $IMSI_d$.

FIG. 1 shows a part of a telecommunications network wherein a secure element includes two such IMSIs.

In this Figure, a secure element 10, shown as a SIM or USIM card, is included in a mobile terminal 11.

The terminal 11 communicates via a BTS station which is not shown, with an assembly 12, including a MSC 15 (Mobile Switching Center) associated with a VLR (Visitor Location Register) and a data base 17 including the temporary IMSIs and the final IMSIs associated with such temporary IMSIs.

Upon the first connection of the secure element 10 to the network, the temporary IMSI, $IMSI_t$ is transmitted from the mobile terminal 11 to the telecommunications network. The temporary IMSI, $IMSI_t$ is detected by the assembly 12 as being a temporary IMSI and the attempted connection is routed toward an automatic connection detection device 14. The latter then makes the connection with a HLR 13 by indicating that the final IMSI associated with the received temporary IMSI must be funded. Then, the automatic connection detection device 14 informs the assembly 12 that the final IMSI is funded. Such piece of information is also transmitted to the terminal 11 and to the secure element 10, either by the assembly 12, or directly by the automatic connection detection device 14. Thus, the secure element is informed that now it may use the $IMSI_d$ instead of the $IMSI_t$. Upon the next attempted connection, the secure element 10 and/or the mobile terminal 11 will use the $IMSI_d$ to get connected to the network. When receiving the $IMSI_d$, the assembly 12 will directly forward the request for connection to the HLR 13, with the automatic connection detection device 14 being no longer prompted.

As the temporary IMSI, $IMSI_t$ is no longer used by the secure element 10, the latter can be recycled, i.e. be used for customizing another secure element.

The drawback of this solution lies in that the number of $IMSI_t$ is limited at the level of the telecommunications network. Then the operator must manage these as the $IMSI_d$ are managed in the state of the art, in order to be able to recycle these.

Using a pseudo-identifier obtained with the help of the IMSI, and of two random values is also known from document U.S. Pat. No. 6,225,888, to prevent fraud and to reinforce security between the network antenna and a mobile terminal. The recognition of the pseudo-identifier by the network assures the latter that there is no fraud and the IMSI is then used in order to complete the authentication. Such method is repeated for each new attempted access to the network by the mobile terminal, i.e. in practice upon each turning on of the mobile terminal.

The present invention aims more particularly at remedying such drawbacks.

More precisely, one of the objects of the invention is to provide a method for managing IMSIs enabling one operator not to fund not used IMSIs in a HLR, while avoiding storing two IMSIs in each secure element.

This object, and others, which will appear subsequently, are reached by a method for calculating a first identifier of a secure element of a mobile terminal according to a second identifier of such secure element, with the first identifier being a temporary identifier and the second identifier being a final identifier of the secure element in a telecommunications network, the method comprising the steps of:

a—during the first attempted connection of the mobile terminal to the telecommunications network, calculating the first identifier according to the second identifier;

b—transmitting the first identifier to the telecommunications network;

c—in response to a message of acceptance of the first identifier from the telecommunications network, inhibiting the use of the first identifier by the secure element and, for every subsequent attempted connection to the telecommunications network, using the second identifier to authenticate said secure element.

Advantageously, the step -a- consists in calculating the first identifier according to the second identifier by applying a mask to the second identifier.

Preferably, the application of the mask consists in modifying the condition of at least one bit of the second identifier, with the condition of the bit being recognized at the level of the network as being that of a temporary identifier.

In an advantageous embodiment, the method consists in intercepting the second identifier transmitted from the secure element to the mobile terminal and in converting it into the first identifier.

Other characteristics and advantages of the invention will appear when reading the following description of two advantageous embodiments of the invention, given for illustrative and not limitative purposes, and the appended Figures, wherein.

Figure 1:
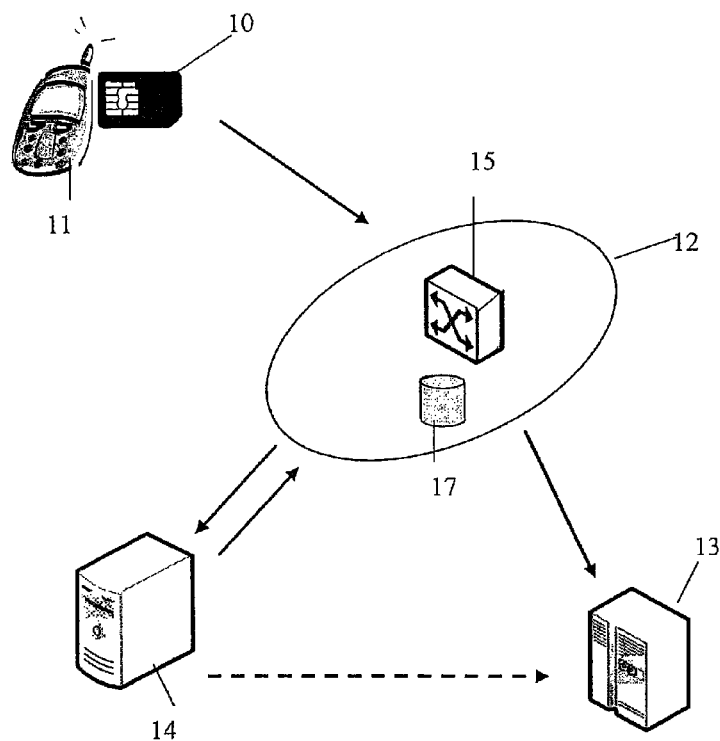
FIG. 1 shows a part of a telecommunications network, wherein a secure element includes two IMSIs.

FIG. 1 describes a reference to the state of the art.

Figure 2:
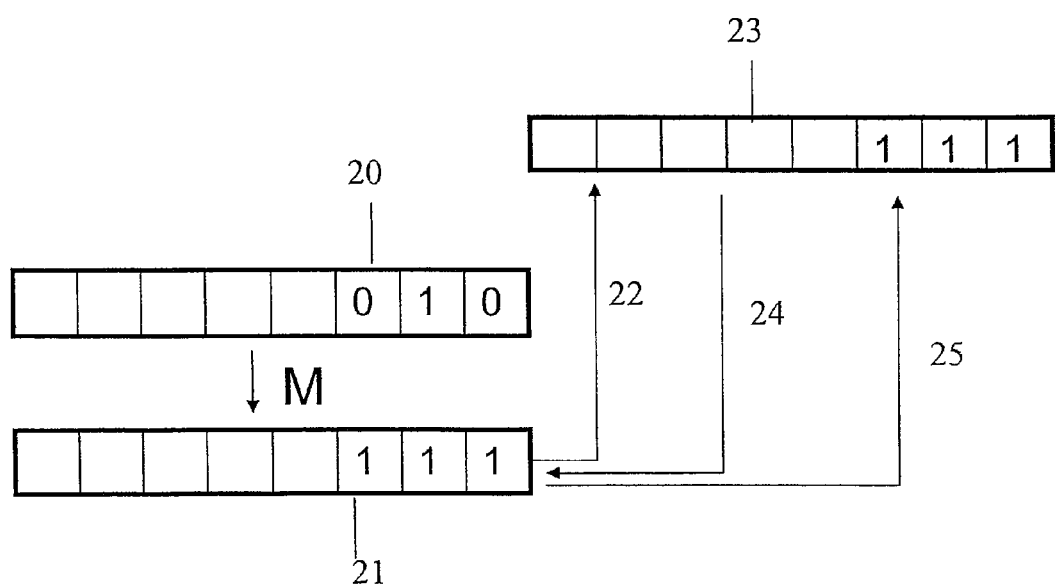
FIG. 2 shows a first embodiment of the present invention.

FIG. 2 shows a first embodiment of the present invention.

According to UIT's recommendation E 212, the IMSI identity is composed of three fields: MCC, MNC and MSIN:

- 3 digits corresponding to the MCC (Mobile Country Code), i.e. the code of the country;
- 2 or 3 digits corresponding to the MNC (Mobile Network Code), i.e. the operator's code.
- 10 digits or less corresponding to the MSIN (Mobile Subscriber Identification Number), i.e. the subscriber's number within the GSM network. The number H1 H2 (2 digits) is added in front of the MSIN to give the address of the network subscriber's HLR.

In FIG. 2, reference 20 corresponds to a part of the MSIN, for example the last 8 bits of the MSIN. In this example, the last three bits are 010. Such last bits are those of the final IMSI, $IMSI_d$ of a secure element. In this first embodiment, the invention provides, upon the first attempted connection of the subscriber to the operator's network, to apply a mask M to the $MSIN_d$ of the secure element in order to generate a temporary IMSI, $IMSI_t$, the last bits of the last byte 21 of which are no longer 010, but 111. This masking operation may consist, in a simplified embodiment, in a simple conversion of the 0 bits into 1 bits. The masking function may be more sophisticated, as will be seen subsequently.

Upon the first attempted connection to the operator's network, $IMSI_t$, with its last three 1 bits is thus transmitted (step 22) to the assembly 12 of FIG. 1. Upon receiving the byte 23, the latter detects, by reading its data base 17 or thanks to the structure of the IMSI received (last 1 bits), that this is not a final IMSI, $IMSI_d$ but a temporary IMSI, $IMSI_t$. The automatic connection detection device 14 is then contacted for funding in the HLR 13 the final IMSI, $IMSI_d$ the last bits of which are 010.

A message 24 authorizing access to the network is transmitted to the secure element when the latter has been authenticated by its temporary IMSI $IMSI_t$.

The final IMSI $IMSI_d$ may be calculated by applying to the temporary IMSI $IMSI_t$ a function, which is reciprocal to the one obtained by applying the mask M. Such a reciprocal function can be noted $M^{-1}$. As a matter of fact, it is important to be able to restore the final IMSI $IMSI_d$ from the temporary IMSI $IMSI_t$ at the level of the automatic connection detection device 14 or at the level of the HLR 13, so that upon the next attempted connection of the user to the network, this $IMSI_d$ is recognized at the level of the assembly 12 to be transmitted to the HLR 13 as the final IMSI. When funded in the HLR 13, the $IMSI_d$ can be invoiced to the operator.

The final IMSI $IMSI_d$ can also be transmitted during a step 25 from the terminal to the network, for example via SMS.

The masking function M may be a simple inversion of the MSIN bits in a preferred embodiment. In this first embodiment, the masking function is executed by an application installed at the level of the SIM card 10.

When the $IMSI_t$ is recognized, at the level of the automatic connection detection device 14, the latter sends a command for deactivating the $IMSI_t$ at the level of the card 10. The latter will use the $IMSI_d$ in the future by deactivating the function M.

Figure 3:
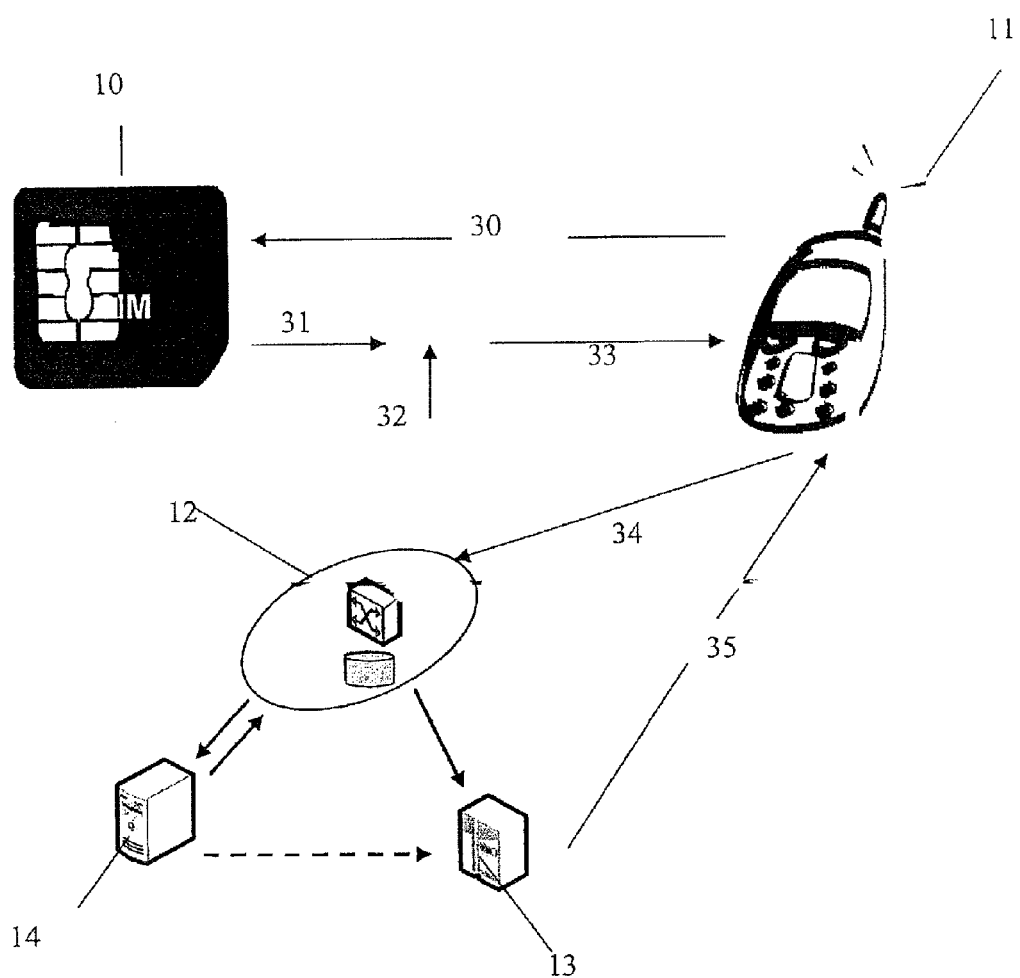
FIG. 3 shows a second embodiment of the present invention.

FIG. 3 shows a second embodiment of the present invention.

In this embodiment, instead of providing a masking function at the level of the SIM card 10, it is provided to modify the operation system of the SIM card 10. Upon the first attempted connection 30 to the network, the terminal 11 asks the card 10 for its IMSI number. The latter answers by sending back its final IMSI $IMSI_d$, during a step 31. The operation system 32 of the card 10 intercepts the $IMSI_d$ and the temporary IMSI $IMSI_t$ is substituted for it, and thus the $IMSI_t$ is transmitted to the terminal 11, during a step 33. The substitution of the temporary IMSI $IMSI_t$ for the final IMSI $IMSI_d$ may also consist in using a mask M such as described while referring to FIG. 2.

The next step consists in transmitting the $IMSI_t$ to the assembly 12 which recognizes that this IMSI is a temporary one. The automatic connection detection device 14 is then contacted for funding the final IMSI $IMSI_d$ in the HLR 13. When the latter is funded, the HLR or the automatic connection detection device 14 sends a message to the terminal 11 to deactivate the substitution of the temporary IMSI $IMSI_t$ for the final IMSI $IMSI_d$. Upon the following attempted connection, the final IMSI $IMSI_d$ will be transmitted from the card to the terminal 11 without being intercepted and modified by the operation system 32, and the assembly will recognize it as a final IMSI $IMSI_d$ and will directly contact the HLR 13.

The above description has been given for illustration purposes only and not for limitation purposes and the persons skilled in the art will easily imagine other embodiments of the present invention within the scope of the claims.

The invention claimed is:

1. A method comprising the steps of:
   (a) during a first attempt to connect a mobile terminal to a telecommunications network, calculating a first, temporary identifier of a secure element of said mobile terminal according to a second, final identifier of said secure element;
   (b) transmitting said first identifier to said telecommunications network; and
   (c) in response to a message of acceptance of said first identifier from said telecommunications network, inhibiting the use of said first identifier by said secure element and, for every subsequent attempt to connect to said telecommunications network, using said second identifier to authenticate said secure element.

2. A method according to claim 1, wherein the step of calculating the first identifier comprises calculating said first identifier according to said second identifier by applying a mask to said second identifier.

3. A method comprising the steps of:
(a) during a first attempt to connect a mobile terminal to a telecommunications network, calculating a first, temporary identifier of a secure element of said mobile terminal according to a second, final identifier of said secure element,
wherein the step of calculating the first identifier comprises calculating said first identifier according to said second identifier by applying a mask to said second identifier,
wherein the application of said mask comprises modifying the condition of at least one bit of said second identifier, with the condition of said bit being recognized on said network as being that of a temporary identifier;
(b) transmitting said first identifier to said telecommunications network; and
(c) in response to a message of acceptance of said first identifier from said telecommunications network, inhibiting the use of said first identifier by said secure element and, for every subsequent attempt to connect to said telecommunications network, using said second identifier to authenticate said secure element.

4. A method according to claim 1, including intercepting said second identifier transmitted from said secure element to said mobile terminal and converting it into said first identifier.

* * * * *